April 13, 1965     I. N. HUTCHINSON ETAL     3,178,133
AUTOMATIC TRIM SYSTEM
Filed Feb. 10, 1961
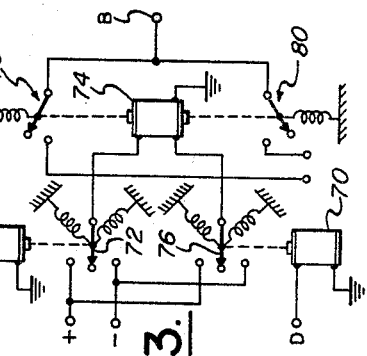
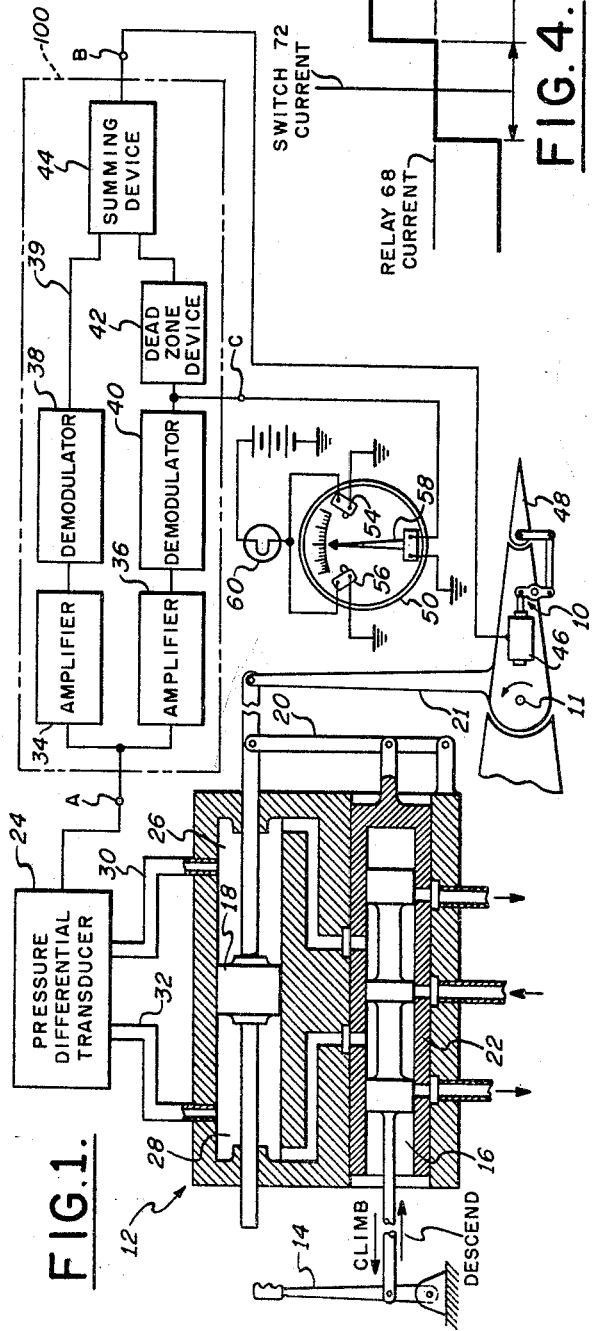
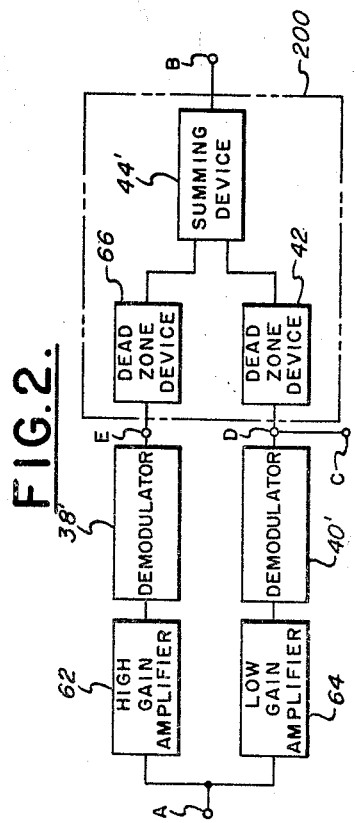
INVENTORS
IRVING N. HUTCHINSON
MARTIN H. PETERSSEN
BY
ATTORNEY

United States Patent Office 3,178,133
Patented Apr. 13, 1965

3,178,133
AUTOMATIC TRIM SYSTEM
Irving N. Hutchinson, Syosset, N.Y., and Martin H. Peterssen, Phoenix, Ariz., assignors to Sperry Rand Corporation, Great Neck, N.Y., a corporation of Delaware
Filed Feb. 10, 1961, Ser. No. 88,436
7 Claims. (Cl. 244—77)

This invention relates generally to flight control apparatus and more particularly to improvements in apparatus for automatically trimming the control surfaces of an aircraft.

Presently employed apparatus for automatically trimming aircraft control surfaces usually produce signals representing the hinge moments about respective control surface pivot points; these signals are applied then to respective servos to drive the control surface trim tabs, thereby cancelling the hinge moment signals and maintaining each control surface in a trimmed condition. The hinge moment signals so produced are proportional to the steady, or long term, differences between the pressures on opposite sides of respective control surfaces and may be provided, for example, in the manner disclosed in U.S. Patent 2,786,176, i.e., by sensing the steady pressure differential across the main actuator for each control surface.

In automatic trimming equipment for modern high speed aircraft, it is essential that the hinge moment signals always remain below predetermined levels, i.e., each control surface be substantially trimmed at all times, since, at high speeds, substantial mistrim conditions can result in dangerous modes of flight. Apparatus embodying the present invention is useable with automatic trim systems and operates to alert the pilot to system failures and to prevent dangerous mistrim conditions from ever occurring.

Generally, the apparatus of the present invention is provided with a normally operative and a normally inoperative channel to which a hinge moment signal is applied simultaneously, the normally inoperative channel being provided with a dead zone device which makes that channel unresponsive to hinge moment signals below a predetermined magnitude. The hinge moment signal which is applied to the dead zone device is applied also to a trim meter, the scale of which has limits that exactly coincide with the width of the "dead zone," i.e., a signal which is just large enough to pass through the "dead zone" will cause the meter pointer to move beyond the limits of the scale, and represent the maximum tolerable mistrim condition. At the extremities of the meter scale, switches are positioned for lighting a failure indicating lamp when the meter pointer moves out of its normal range. The output signals from both channels are applied to a summing device, the sum signal of which operates to trim the craft and thereby cancel the hinge moment signal. In flight, with the automatic trim system activated and operating properly, only the normally operative channel applies a hinge moment signal to the summing device since the sum signal operates to keep the craft so trimmed that a hinge moment signal large enough to pass through the dead zone device is never generated; that is, the normally operative channel alone operates to trim the craft automatically. Normally, the trim meter pointer remains at a central reference position on the meter scale and varies only slightly from that position when the hinge moment signal is varied, e.g., when the craft maneuvers. In the event that the normally operative channel fails to apply a hinge moment signal to the summing device, the craft will eventually become so mistrimmed that a hinge moment signal large enough to drive the trim meter pointer to one of its extreme positions will be generated, thereby lighting the lamp and altering the pilot to the fact that something is wrong with his automatic trim system. However, since the width of the "dead zone" in the normally inoperative channel coincides exactly with the limits of the meter scale, a signal is applied from the normally inoperative channel to the summing device at the instant the lamp lights, thereby preventing the craft from becoming dangerously mistrimmed. In addition to alerting the pilot to a failing automatic trim system and keeping the craft substantially trimmed, the apparatus of the present invention operates also to prevent spurious signals from dangerously mistrimming the craft. For example, in the event a spurious long term signal is applied to the normally operative channel which causes the craft to become mistrimmed, a hinge moment signal will be applied, after the lamp lights, through the normally inoperative channel to the summing device which will substantially cancel the spurious signal, thereby effectively disabling the automatic trim system.

A principal object of the invention is to provide apparatus for assuring that a craft control surface is always substantially trimmed.

Another object of the invention is to provide apparatus which alerts a pilot to a failing automatic trim system and which operates further to prevent dangerous mistrim conditions from being caused by spuriously generated signals.

The invention will be described with reference to the figures wherein:

FIG. 1 is a block diagram of apparatus embodying the present invention,

FIG. 2 is a block diagram of a presently preferred specie of the invention,

FIG. 3 is a schematic diagram of a practical circuit useable by the present invention, and FIG. 4 is a diagram useful in describing the operation of the circuit of FIG. 3.

Referring to FIG. 1, a control surface 10, e.g., an aircraft elevator, is operated by an actuator 12 in response to manipulations of the craft control stick 14. The actuator 12 is conventional in design and has a control valve 16 which supplies hydraulic fluid to drive a piston 18 in accordance with manipulations of the control stick 14. Position feedback is provided from the control surface 10 to the control valve 16 by means of a linkage 20 which moves the sleeve 22 of the control valve 16. With the control surface 10 in the position commanded by the control stick 14, any steady difference between the pressures on the opposite sides of the control surface 10 produces a hinge moment about the pivot point 11 which, by means of the linkage 21, causes a pressure differential to appear across the piston 18. To relieve the steady pressure differential across the piston, trim tabs or the like are usually provided on the control surface and are operated to cancel the hinge moment, i.e. trim the control surface.

A pressure differential transducer 24 is connected by means of capillary tubes 30 and 32 to the two chambers 26 and 28 of the actuator 12, the capillary tubes 30 and 32 operating to make the transducer 24 responsive only to steady pressure differentials, i.e., long term pressure differentials. The pressure differential transducer 24, which may be of the type shown in FIG. 2 of U.S. Patent 2,786,176, provides a signal, i.e., a hinge moment signal, having either one of two senses depending on which chamber, 26 or 28, has the greater pressure. For example, the transducer may provide a signal having one phase when the pressure in chamber 26 is greater than the pressure in chamber 28 and a signal having a different phase when the pressure in chamber 28 is greater than the pressure in chamber 26. The output signal from the pressure differential transducer 24 is applied simultaneously to amplifiers 34 and 36 which, in turn, apply their output signals to demodulators 38 and 40. The demodulators 38 and 40 operate to detect the sense of the signal produced by the pressure differential transducer 24. The demodulator 40 applies its output signal to a dead zone device 42, e.g. the device shown and described in "Handbook of Automation, Computation and Control," volume 2, John Wiley and Sons, Inc., New York, pages 23–25, FIG. 27, the "dead zone" of which has a width representative of a safe trim condition. A summing device 44 receives the output signals from the demodulator 38 and the dead zone device 42 and operates to produce a signal representing the sum of its input signals. The summing device 44 output signal is applied to a trim tab actuator 46, similar to the actuator used with the apparatus of U.S. Patent 2,786,176, which operates to move the trim tab 48, thereby cancelling the hinge moment about the pivot point 11 and the pressure differential across the piston 18. A meter 50 receives the demodulated hinge moment signal and operates to display the magnitude and sense of the hinge moment, i.e., the amount and direction that the control surface is mistrimmed. The meter 50 has a scale 52 which, as aforesaid has extreme limits that exactly coincide with the width of the "dead zone." Switches 54 and 56 are so positioned on the meter 50 that they are operated when the meter pointer 58 reaches the extreme limits of the scale 52. When operated, the switches 54 and 56 close a circuit in which a lamp 60 is provided.

In operation, when the pilot, for example, moves the control stick 14 to execute a climb maneuver, the control surface 10, i.e., the elevator, rotates in the direction shown by the small arrow near the pivot point 11. With the control surface 10 held in the position commanded, a hinge moment at the pivot point 11 causes a pressure differential to appear across the piston 18 as aforedescribed. This pressure differential is converted to a representative signal, i.e., a hinge moment signal, by the pressure differential transducer 24, the hinge moment signal being applied then to the amplifiers 34 and 36. The demodulators 38 and 40 operate to detect the sense of the hinge moment signal applied to the amplifiers 34 and 36 and apply their output signals to the summing device 44, the demodulator 40 output signal being applied to the summing device 44 through the dead zone device 42. With the apparatus functioning properly, the summing device 44 has an output signal at the instant a hinge moment starts to appear and applies that signal to the actuator 46 which operates the trim tab 48 to cancel the hinge moment. Since the hinge moment is cancelled almost instantly the meter pointer 58 scarcely moves from its reference position, indicating that the craft is being trimmed properly. In the event that the trim system starts to fail, e.g., if the lead 39 breaks, the control surface 10 will eventually become so mistrimmed that the meter pointer will indicate a large hinge moment and will cause one of the microswitches 54 or 56 to operate, thereby lighting the lamp 60. This will alert the pilot to the fact that something is wrong with the trim system. However, at the instant the lamp lights, a signal is applied from the dead zone device 42 to the summing device 44 which operates the actuator 46 to prevent the control surface 10 from being further mistrimmed, i.e., more than the amount represented by the extreme limits of the meter scale 52. Therefore, if desired, the automatic trim system may be left on and operated in a semi-automatic manner. For example, the pilot can manually trim the craft with the assurance that a dangerous mistrim condition will be prevented from occurring by the hinge moment signal which passes through the dead zone device 42. In addition to permitting semi-automatic operation of a failing automatic trim system, the apparatus of the present invention operates to prevent spurious long term signals from dangerously mistrimming the craft. For example, in the event that a spurious signal is applied to the lead 39 causing the trim tab actuator 46 to mistrim the craft accordingly, a signal representing the amount that the control surface is mistrimmed, i.e., a hinge moment signal, will be provided by the pressure differential transducer 24 and applied through the dead zone device 42 to the summing device 44, wherein the hinge moment signal will be added algebraically to the spuriously generated signal, thereby substantially cancelling the spurious signal and preventing the craft from being mistrimmed by more than the safe amount represented by the extreme limits of the meter scale 52.

Referring to FIG. 2, a circuit which may be substituted for the elements enclosed within the dashed lines 100 of FIG. 1 has a high gain amplifier 62 and a low gain amplifier 64, each of which is adapted to receive the hinge moment signal produced by the pressure differential transducer 24. The output signal from the high gain amplifier 62 is applied to a demodulator 38' and the output signal from the low gain amplifier 64 is applied to a demodulator 40'. The demodulators 38' and 40' operate, like the demodulators 38 and 40, to detect the sense of the signal applied to the amplifiers 62 and 64. Dead zone devices 66 and 42 receive the output signals from the demodulators 38' and 40', respectively, and apply their output signals to a summing device 44'. Like the circuit 100 of FIG. 1, the circuit of FIG. 2 causes the actuator 46 to keep the hinge moment so small that the dead zone device 42 passes a hinge moment signal only when the lamp 60 lights. However, because a dead zone device 66 is placed between the demodulator 38' and the summing device 44', low level noise signals produced in the high gain amplifier 62 and the demodulator 38' are essentially filtered out, thereby smoothing the operation of the trim actuator 46.

Referring to FIG. 3, a practical circuit, which may be used for the elements enclosed within the dashed lines 200 of FIG. 2, has two relays 68 and 70, each of which requires a particular pull-in current in order to operate an associated switch. Normally open switches 72 and 76 are associated respectively with the relays 68 and 70 and, when operated, connect current sources to a relay 74 having a grounded center tap. The relay 74 has normally open switches 78 and 80 associated therewith, each of which is adapted to connect a source of power of a different sense to point B. Since the relays 68 and 70 require particular pull-in currents and operate switches to connect constant current sources to the relay 74, they, in combination with their associated switches, have response characteristics as shown in FIG. 4, i.e., response characteristics with dead zones. Under normal operation the relay 68 is operated by hinge moment signals (low level noise signals having no effect on the relay) to move the switch 72 from its neutral position to either its up or down position. This causes a current of the proper sense to pass through the relay 74, thereby energizing the relay in the proper direction. In the event that the relay 68 becomes inoperative, the relay 70 will operate eventually and will, likewise, energize the relay 74 in the proper direction. Should, however, the relay 68 become inoperative with the switch 72 in either its up or down position, the craft will eventually become so mistrimmed that the relay 70 will operate the switch 76 to apply a counteracting current to the relay 74, thereby disabling that relay. If preferred, current limiting means may be provided in each of the relay circuits 68 and 70 to prevent excessive hinge moment signals from breaking down those relays.

While the invention has been described in its preferred embodiments, it is to be understood that the words which have been used are words of description rather than of limitation and that changes within the purview of the appended claims may be made without departing from

What is claimed is:

1. Apparatus for use in automatically trimming a pivotable control surface having a trim tab comprising means for producing a signal representing the hinge moment about said control surface pivot point, first means for receiving said hinge moment signal, second means for receiving said hinge moment signal and being unresponsive to hinge moment signals below a predetermined magnitude, summing means for receiving the output signals from said first and second means producing a signal representing the sum thereof, third means for receiving said hinge moment signal indicating the magnitude of said signal, means indicating when said hinge moment signal has said predetermined magnitude, and means for positioning said trim tab adapted to receive the signal from said summing means to position the trim tab in proportion thereto.

2. Apparatus for use with automatic trimming equipment for a control surface producing a hinge moment signal representing the amount said control surface is mistrimmed, said signal being adapted to be applied to an actuator for trimming the control surface, comprising means having a predetermined amount of gain, second means having a lower predetermined amount of gain, both of said means being adapted to receive simultaneously said hinge moment signal, and means unresponsive to signals below a predetermined magnitude representative of an unsafe trim condition receiving the output signals from both said gain means, said means unresponsive to signals below a predetermined magnitude operating to produce the signal adapted to be applied to said trimming actuator.

3. Apparatus for automatically trimming a control surface having a trimming device comprising means producing a signal representing the hinge moment about the pivot point of said surface, means having a first amount of gain receiving said hinge moment signal, means having a second lower amount of gain also receiving said hinge moment signal, summing means unresponsive to signals below a predetermined level receiving the output signals from said means having a first and a second amount of gain, and means for moving said trimming device receiving the output signal from said summing means to move said trimming device in accordance with that signal, whereby the trimming device trims the control surface and cancels its hinge moment.

4. Apparatus for automatically trimming a control surface having a trimming device comprising means producing a signal representing the hinge moment about the pivot point of said surface, means having a first amount of gain receiving said hinge moment signal, means having a second lower amount of gain also receiving said hinge moment signal, summing means unresponsive to signals below a predetermined level receiving the output signals from said means having a first and a second amount of gain, indicating means responsive when said means having a lower amount of gain reaches said predetermined level, and means for moving said trimming device receiving the output signal from said summing means to move said trimming device in accordance with that signal, whereby the trimming device trims the control surface and cancels its hinge moment.

5. Apparatus for use with automatic trimming equipment for a control surface producing a signal representing the amount said control surface is mistrimmed, said signal being adapted to be applied to an actuator for trimming the control surface, comprising means having a first measure of gain, means having a second lower measure of gain, both of said means receiving simultaneously said mistrim signal, first and second means unresponsive to signals below predetermined magnitudes receiving respectively the output signals from said means having a first measure of gain and said means having a second measure of gain, and summing means receiving the output signals from said first and second means unresponsive to signals below predetermined magnitudes to produce a sum signal, said sum signal being adapted to be applied to said trimming actuator.

6. Apparatus for automatically trimming a craft control surface comprising means producing a signal representing the amount said control surface is mistrimmed, means having a first measure of gain, means having a second lower measure of gain, both of said means receiving simultaneously said mistrim signal, first and second means unresponsive to signals below predetermined magnitudes receiving respectively the output signals from said means having a first measure of gain and said means having a second measure of gain, summing means receiving the output signals from said first and second means unresponsive to signals below predetermined magnitudes to produce a sum signal, and means operable with said control surface responsive to said summing means output signals to cancel said mistrim signal.

7. Apparatus for use with automatic trimming equipment for a control surface producing a signal representing the amount said control surface is mistrimmed, said signal being adapted to be applied to an actuator for trimming the control surface, comprising means having a first measure of gain, means having a second lower measure of gain, both of said means receiving simultaneously said mistrim signal, first and second means unresponsive to signals below a predetermined magnitude receiving respectively the output signals from said means having a first measure of gain and said means having a second measure of gain, a meter responsive to the signal from said means having a second measure of gain to indicate the magnitude of said signal, alarm means responsive when said signal applied to said meter has said predetermined magnitude, and summing means receiving the output signals from said first and second means unresponsive to signals below a predetermined magnitude to produce a sum signal, said sum signal being adapted to be applied to said trimming actuator.

References Cited by the Examiner
UNITED STATES PATENTS

| | | | |
|---|---|---|---|
| 2,455,364 | 12/48 | Hays | 318—30 |
| 2,859,437 | 11/58 | Atlas | 343—11 |
| 2,945,375 | 7/60 | Greene et al. | 244—77 X |
| 2,960,284 | 11/60 | Perkins | 244—77 |
| 2,967,680 | 1/61 | Meyers et al. | 244—77 |

FERGUS S. MIDDLETON, *Primary Examiner.*

MILTON BUCHLER, *Examiner.*